United States Patent [19]

Ling et al.

[11] Patent Number: 4,637,989

[45] Date of Patent: Jan. 20, 1987

[54] METHOD OF PREPARING A CERAMIC COMPOSITION

[75] Inventors: Hung C. Ling, West Windsor Township, Mercer County; Warren W. Rhodes, Raritan; Man F. Yan, Berkeley Heights, all of N.J.

[73] Assignees: AT&T Technologies, Inc., Berkeley Heights; Bell Telephone Laboratories, Murray Hill, both of N.J.

[21] Appl. No.: 717,814

[22] Filed: Mar. 29, 1985

[51] Int. Cl.$^4$ .............................................. C04B 35/00
[52] U.S. Cl. ..................................... 501/135; 501/134
[58] Field of Search ................................ 501/134, 135

[56] References Cited

U.S. PATENT DOCUMENTS

| | | | |
|---|---|---|---|
| 4,216,102 | 8/1980 | Furukawa et al. | 501/135 |
| 4,339,544 | 7/1982 | Sakabe et al. | 501/134 |
| 4,536,821 | 7/1985 | Wheeler et al. | 501/135 X |

FOREIGN PATENT DOCUMENTS

| | | | |
|---|---|---|---|
| 0010744 | 1/1977 | Japan | 501/134 |
| 0025607 | 2/1982 | Japan | 501/134 |
| 0105208 | 6/1984 | Japan | 501/135 |

OTHER PUBLICATIONS

Swartz et al., Materials Research Bulletin, vol. 17, pp. 1245–1250, 1982.

Primary Examiner—William R. Dixon, Jr.
Assistant Examiner—Karl Group
Attorney, Agent, or Firm—J. F. Spivak

[57] ABSTRACT

A predominantly perovskite phase $Pb(Zn_xMg_{1-x}Nb_2)_{\frac{1}{3}}O_3$ ceramic is prepared by first forming a columbite precursor having the formula $Zn_xMg_{1-x}Nb_2O_6$ and reacting this material with PbO at temperatures of from 800° C. to at least 1000° C. as x varies from 0.025 to 0.7.

3 Claims, 5 Drawing Figures

METHOD OF PREPARING A CERAMIC COMPOSITION

TECHNICAL FIELD

This invention relates to a method of preparing ceramic compositions and more particularly, to solid solutions of ceramics having the perovskite crystal structure.

BACKGROUND OF THE INVENTION

Perovskite type ceramic materials have been particularly suitable as ferroelectrics and used in capacitors due to their relatively high dielectric constant (and correspondingly high electrostrictive strains). However, it has been difficult to prepare polycrystalline ceramic perovskite materials such as those having a general formula $Pb(A_{\frac{1}{3}}^{2+}B_{\frac{2}{3}}^{5+})O_3$ wherein A can be one or more divalent elements Generally, when prepared by sintering from the oxides, a stable pyrochlore phase develops which has a much lower dielectric constant than the corresponding perovskite phase.

S. L. Swartz and T. R. Shrout reported in Materials Research Bulletin, Vol. 17, pp. 1245–1250, 1982 that the above mentioned difficulty, i.e., a formation of the pyrochlore phase, can be eliminated when preparing a lead magnesium niobate by first sintering magnesium oxide together with niobium oxide to form a magnesium niobate having the columbite structure and then sintering this material with lead oxide to form the final desired lead magnesium niobate having a perovskite structure. However, while the technique of forming the precursor was applicable for the preparation of the aforementioned lead magnesium niobate and for lead nickel niobate, it was found that it was not applicable to the formation of a lead zinc niobate, lead aluminum niobate or lead chromium niobate. In the latter three compounds, the pyrochlore phase still resulted even when the zinc, aluminum and chromium. were prereacted with the niobium as taught by Swartz et al.

SUMMARY OF THE INVENTION

We have now discovered, that one can form a mixed ceramic, i.e., a solid solution of a zinc containing lead niobate having a predominantly perovskite phase structure by first forming a columbite type precursor of a magnesium zinc niobate having the desired ratio of zinc to magnesium and calcining this columbite phase material with lead oxide to form the mixed lead zinc magnesium niobate having predominantly a perovskite phase. In order to achieve this perovskite phase, especially with concentrations of zinc representing up to 70 mole percent of the total number of moles of zinc and magnesium, the calcining temperature should be at least 900° C. and preferably at least 1000° C.

DETAILED DESCRIPTION

Generally, the novel method involves the steps of preparing a zinc magnesium niobate precursor having the columbite phase and then calcining this precursor with lead oxide at a temperature so as to form predominantly a perovskite lead magnesium zinc niobate solid solution.

The precursor may be prepared by first forming columbite magnesium niobate ($MgNb_2O_6$) and columbite zinc niobate ($ZnNb_2O_6$) and prereacting these niobates in the desired mole ratios to form columbite $Zn_yMg_{1-y}Nb_2O_6$. In the alternative, one can calcine the desired mole ratios of magnesium oxide, zinc oxide and niobium oxide so as to form the mixed zinc magnesium niobate ($Zn_xMg_{1-x}Nb_2O_6$) having a columbite structure.

Figure 1:
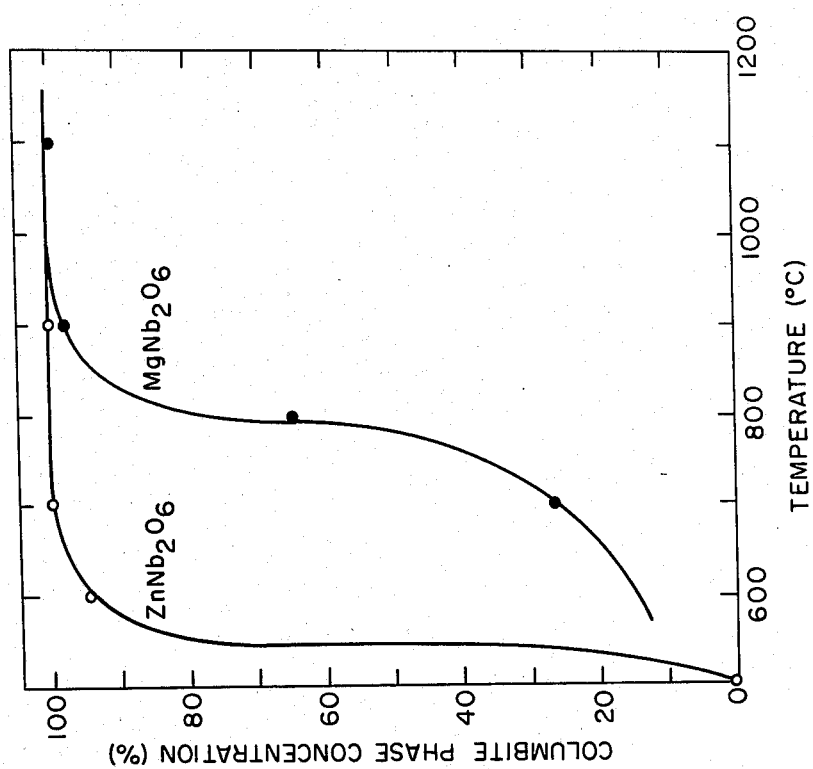
FIG. 1 shows the columbite phase concentration of zinc niobate and magnesium niobate prepared from the oxides as a function of calcining temperature.

As can be seen with reference to FIG. 1, zinc niobate having the columbite phase can be formed by calcining ZnO and $Nb_2O_5$ at temperatures of about 700° or greater in order to form essentially 100 percent columbite phase material. On the other hand, the magnesium oxide and niobium oxide must be calcined at a temperature in excess of about 1000° C. in order to ensure formation of a columbite phase magnesium niobate. A solid solution of the zinc and magnesium niobates can then be formed by calcining these two niobates together at temperatures preferably in excess of 800° C.

Figure 2:
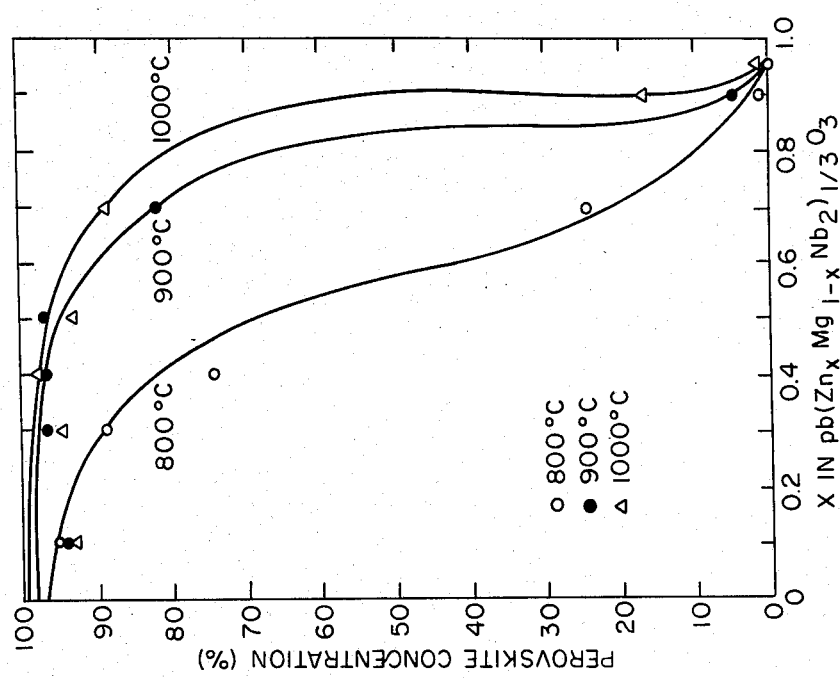
FIG. 2 is a graph showing the perovskite concentration as a function of the mole quantity of zinc in a lead zinc magnesium niobate prepared by calcining the zinc magnesium niobate columbite structure with lead oxide at various calcining temperatures.

As can be seen with reference to FIG. 2, the calcining temperature necessary to form a predominantly perovskite phase lead zinc magnesium niobate having the formula $Pb(Zn_xMg_{1-x}Nb_2)_{\frac{1}{3}}O_3$ obtained by mixing the desired zinc magnesium niobate with one mole lead oxide per mole zinc magnesium niobate is a function of the quantity of zinc in the structure. More particularly, in order to achieve at least 90 percent perovskite material, one can calcine the lead oxide with the columbite precursor at only about 800° C. when the zinc concentration is less than about 0.025. However, as the zinc concentration increases, so must the calcining temperature as well. For example, referring to FIG. 2 one must calcine at a temperature of at least 900° C. to obtain about a 90 percent perovskite level for compositions wherein x is equal to 0.6 and when x is increased to 0.7, a temperature of greater than 1000° C. is required to achieve at least 90 percent perovskite.

Figure 3:
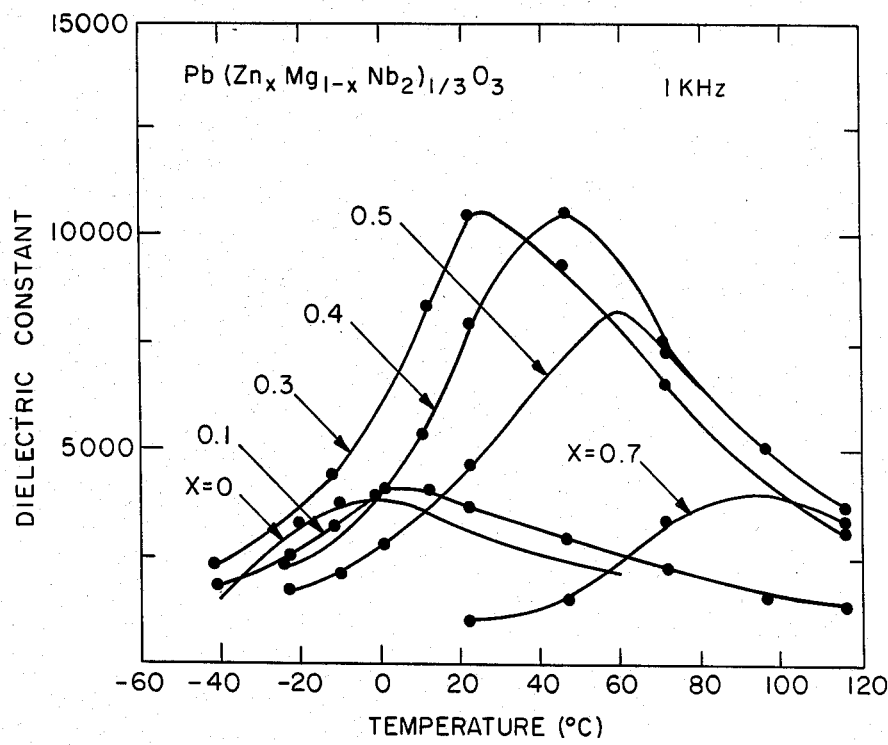
FIG. 3 is a graph showing the dielectric constant versus temperature for various lead zinc magnesium niobates as a function of the mole quantity of zinc in the material when measured at 1 kHz.
Figure 4:
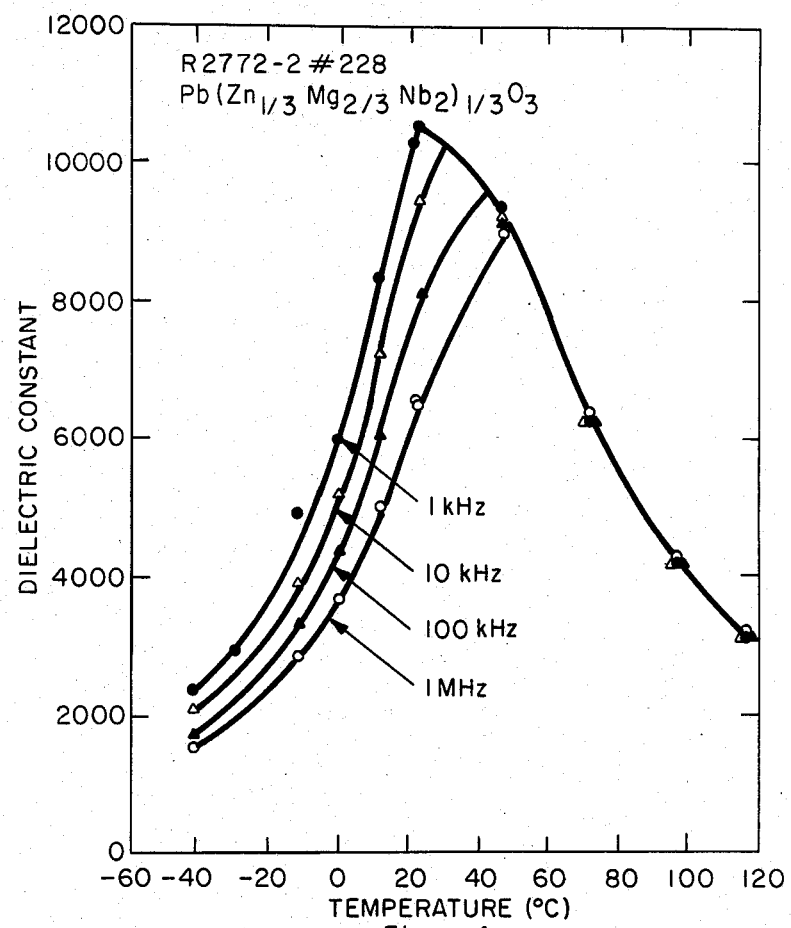
FIG. 4 is a graph showing the dielectric constant of a particular lead zinc magnesium niobate as a function of temperature when measured at different frequencies.
Figure 5:
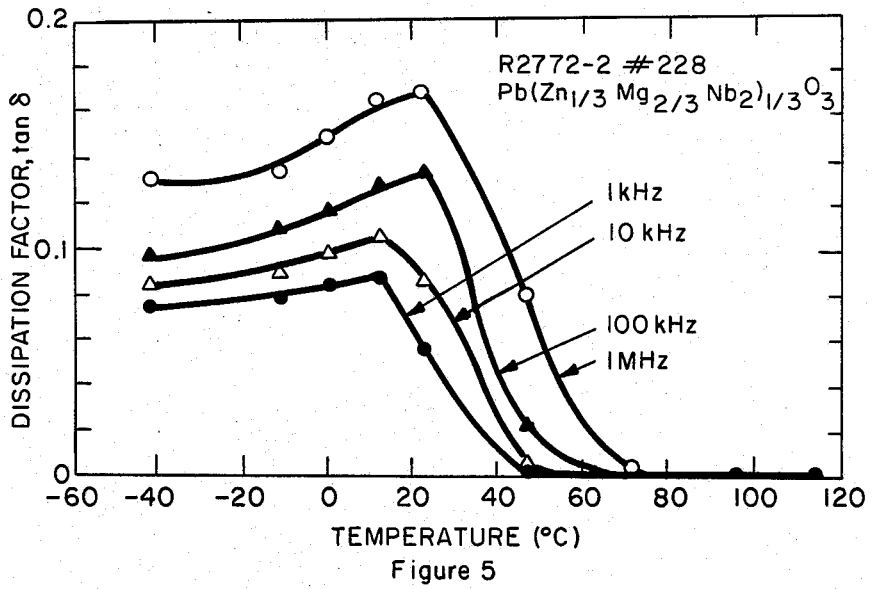
FIG. 5 shows the dissipation factor, as a function of temperature for a particular lead zinc magnesium niobate at different operating frequencies.

The particular final product which one requires may depend upon the particular use for which the product is to be employed. Referring to FIG. 3 one can see that the dielectric constant varies with temperature for the resulting compound when measured at a given frequency, e.g., 1 kHz. Further, the temperature variation and values of dielectric constants obtainable are also dependent upon the amount of zinc in the ceramic material. In addition, referring to FIG. 4, it can be seen that the dielectric constant not only varies with temperature but is also a function of the frequency at which it is measured for a given composition. Likewise, FIG. 5 shows that the dissipation factor or loss is also dependent upon not only the temperature but the frequency at which it is measured for any given composition. The particular compositions with which FIGS. 4 and 5 refer to are $Pb(Zn_{\frac{1}{3}}Mg_{\frac{2}{3}}Nb_2)_{\frac{2}{3}}O_3$.

What is claimed is:

1. A method for forming a sintered ceramic composition having a peak dielectric constant of at least about 7,500 at 1 Khz represented by the formula $Pb(Zn_xMg_{1-x}Nb_2)_{\frac{2}{3}}O_3$ wherein x is from about 0.3 to 0.5 and being at least 90% perovskite phase material comprising the steps of:
    (a) forming a columbite phase of $Zn_xMg_{1-x}Nb_2O_6$;
    (b) reacting the columbite $Zn_xMg_{1-x}Nb_2O_6$ with PbO at a temperature of from greater than 800° C. for a time necessary to form the desired material.

2. The method recited in claim 1, wherein the columbite phase $Zn_xMg_{1-x}Nb_2O_6$ is formed by:
    (a) reacting ZnO and $Nb_2O_5$ at a temperature of at least 700° C. to form columbite phase $ZnNb_2O_6$;
    (b) reacting MgO and $Nb_2O_5$ at a temperature of at least 1000° C. to form columbite phase $MgNb_2O_6$; and
    (c) reacting the resultant products from steps (a) and (b) at a temperature of at least 800° C. in a desired mole ratio to form a mixed columbite phase represented by the formula $Zn_xMg_{1-x}Nb_2O_6$.

3. The method recited in claim 1, wherein the columbite phase $Zn_xMg_{1-x}Nb_2O_6$ is formed by calcining the oxides in a mole ratio of x moles ZnO, $1-x$ moles MgO and 1 mole $Nb_2O_5$ at a temperature so as to form a columbite phase having the formula $Zn_xMg_{1-x}Nb_2O_6$.

* * * * *